W. H. FRANCIS.
METHOD OF HANDLING ARTICLES AND APPARATUS THEREFOR.
APPLICATION FILED DEC. 20, 1920.
1,434,883.
Patented Nov. 7, 1922.
3 SHEETS—SHEET 1.
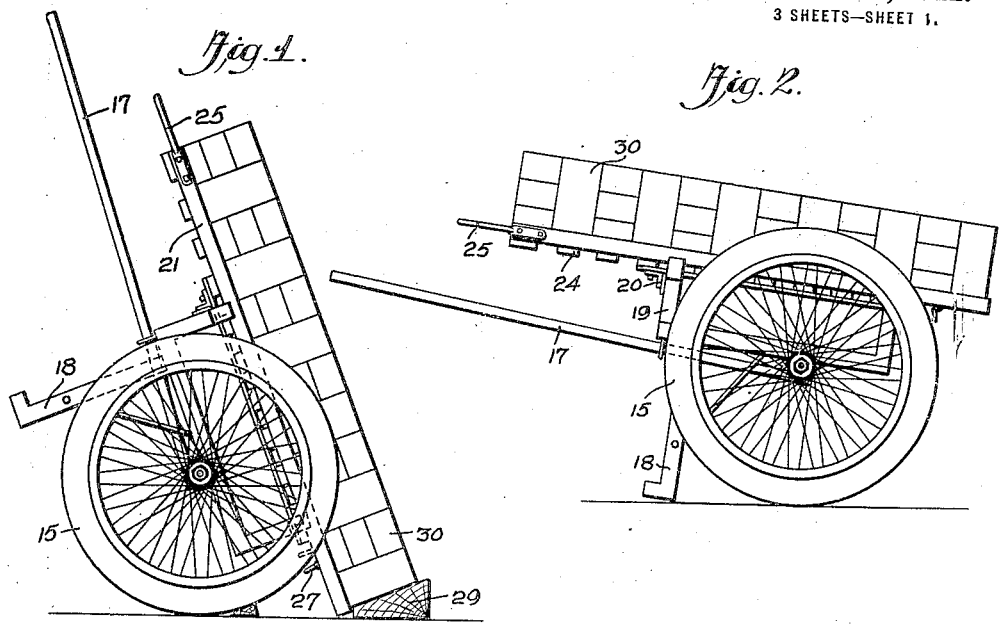
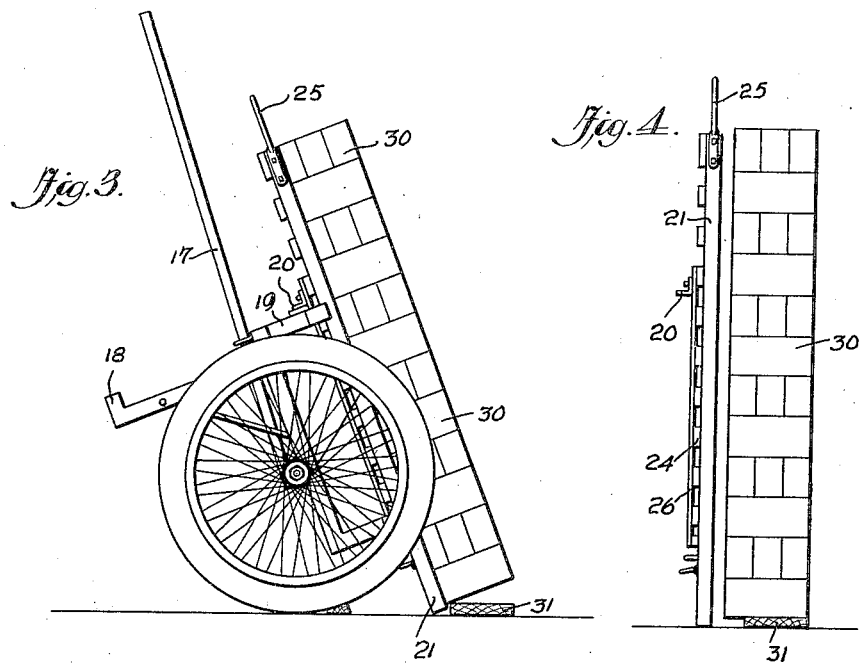
WITNESSES
INVENTOR
WILLIAM H. FRANCIS
BY
ATTORNEYS W. H. FRANCIS.
METHOD OF HANDLING ARTICLES AND APPARATUS THEREFOR.
APPLICATION FILED DEC. 20, 1920.

1,434,883.

Patented Nov. 7, 1922.
3 SHEETS—SHEET 2.

WITNESSES

INVENTOR
WILLIAM H. FRANCIS
BY
ATTORNEYS

W. H. FRANCIS.
METHOD OF HANDLING ARTICLES AND APPARATUS THEREFOR.
APPLICATION FILED DEC. 20, 1920.
1,434,883.
Patented Nov. 7, 1922.
3 SHEETS—SHEET 3.
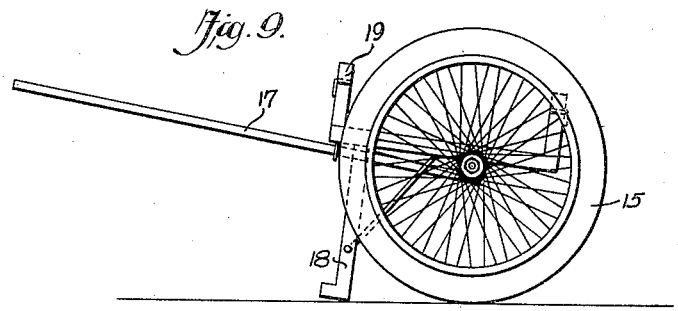
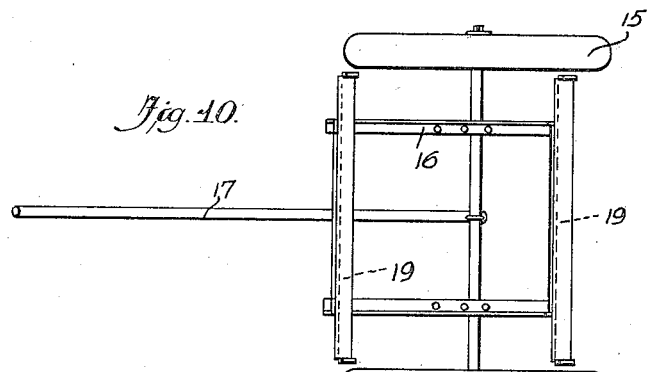
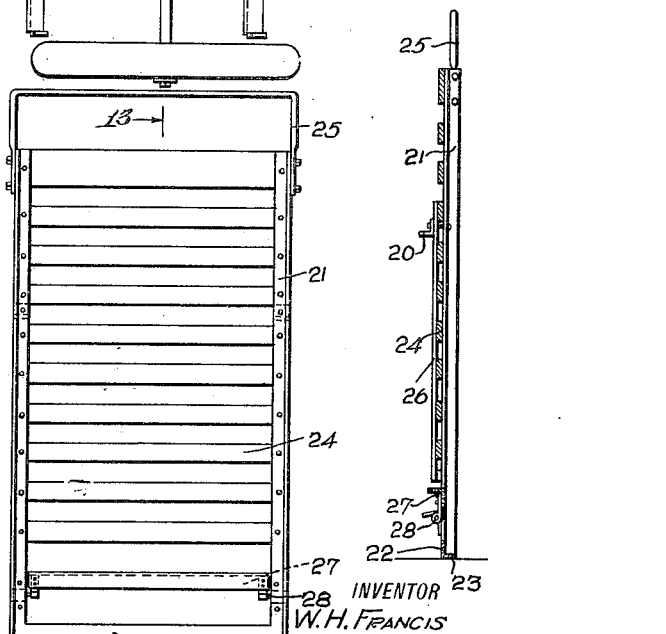
WITNESSES
INVENTOR
W. H. FRANCIS
BY
ATTORNEYS Patented Nov. 7, 1922.

1,434,883

UNITED STATES PATENT OFFICE.

WILLIAM HENRY FRANCIS, OF CHERRYVALE, KANSAS.

METHOD OF HANDLING ARTICLES AND APPARATUS THEREFOR.

Application filed December 20, 1920. Serial No. 431,928.

*To all whom it may concern:*

Be it known that I, WILLIAM H. FRANCIS, a citizen of the United States, and resident of Cherryvale, in the county of Montgomery and State of Kansas, have invented a new and Improved Method of Handling Articles and Apparatus Therefor, of which the following is a full, clear, and exact description.

My invention relates to a method of handling, transporting and stacking articles, and is primarily intended for use in connection with the handling of blocks such as bricks, etc.

In connection with the handling of bricks it is a well appreciated fact that numerous difficulties are experienced. Primarily, a certain percentage of the bricks are spoiled incident to the numerous handlings and rough usage which they receive, in being stacked and transported. The uselessness of these bricks is manifested by chipping, cracking, etc., which comes into being during the handling of the same.

Further, the frequent handling to which the brick is necessarily subjected obviously adds to the retail cost of the same for the reason that a great amount of labor is required in this handling, and each individual of this labor must necessarily be a man above average strength.

Having these defects in mind I have now conceived of a method which is primarily intended for use in connection with the handling of bricks, but which may readily be utilized to advantage in handling blocks and articles of any character, as well as packages, as long as these objects lend themselves to a stacking process, and by means of which a man of ordinary strength may be capable of handling, with great facility, a larger number of objects than a man of superior strength, according to the method previously referred to.

A further object of my invention is the provision of a method of the nature specified, by means of which the bricks may be handled in such a manner that no injury to the same will result.

A still further object of my invention is the provision of an apparatus which will permit of the accomplishment of this object.

Another object of my invention is the provision of both method and apparatus by means of which the bricks or other objects handled may be subjected to an "initial stacking" operation subsequent to which they may be transported to a storage yard or other desirable place, and be subjected to any number of different handling operations, such as arranging them in a railway car without the necessity of having to resort to a restacking operation.

Further objects of my invention will appear in the annexed specification and drawings, which latter present one practical embodiment of my invention, and in which Figure 1 is a side view of the apparatus and objects handled thereby in their initial position subsequent to the stacking of these objects.

Figure 2 illustrates the disposition of the parts while in the act of transportation.

Figure 3 shows the same in the act of arranging these stacked objects in their initial storage position.

Figure 4 illustrates the apparatus and objects subsequent to the parts being thus stored.

Figure 9 is a side view of a part of the apparatus utilized.

Figure 10 is a plan view thereof.

Figure 11 is a front view of the apparatus as illustrated in Figures 9 and 10.

Figure 12 is a plan view of the receiving element forming a part of the apparatus, and Figure 13 is a sectional side view taken on the line 13—13 of Figure 12, and in the direction of the arrows.

Figure 5:
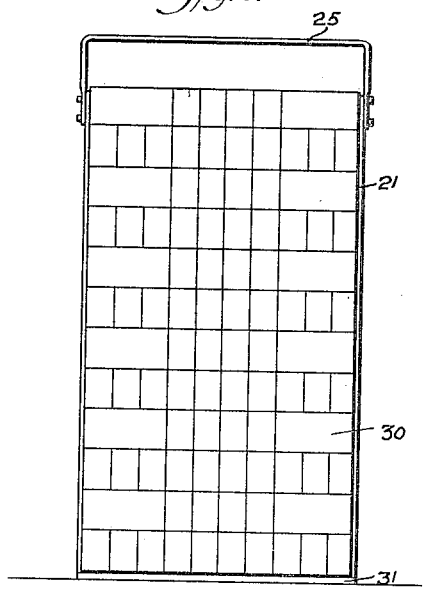
Figure 5 is a front view of the parts as shown in side elevation in Figure 4.

In these views the reference numeral 15 indicates the wheels of a suitable transporting carriage 16, which latter may conveniently be provided with a handle member 17 and a rest 18.

It will be understood, however, that any suitable type of transporting carriage may be utilized to advantage according to the necessities of the surface to be traveled, as well as the weight of the objects being handled.

It is to be noted, however, that the transporting element conveniently includes a pair of supporting brackets 19, which latter serve to engage and retain in applied position a supporting frame by virtue of their engagement with a suitable projection of the latter, such as for instance, an angle iron 20, secured to the lower face of the frame. It will be noted in this connection that by virtue of the fact that the frame is arranged in a plane beyond that of the horizontal, the weight of this element will serve to cause a constant engagement between the projection 20, and the inner bracket 19, but that upon a supporting medium being provided for the frame other than the carriage, a ready disengagement of the bracket 19 and projection of the frame may be effected.

Referring now more particularly to Figures 12 and 13, it will readily be seen that the frame referred to, conveniently includes flanged side portions 21, the lower ends of which are connected together by a bridge piece 22 the lower edge of which is provided with an outwardly extending flange 23 for a purpose hereinafter more fully specified.

Suitable connecting elements, such as slats 24 of any desirable material extend between the side portions 21, and a handle 25 is conveniently provided between the upper ends of the side portions 21 to permit of a ready handling of the frame when this is desired. Also any suitable bracing means such as additional side members 26 may be utilized to bridge the space between the brackets 19, whereby to provide a bracing medium for the frame effectively preventing any distortion of the latter.

Also for a purpose hereinafter more fully specified, a fulcrum member conveniently including a bar 27 pivotally secured as at 28 to the frame, is provided at a point preferably upon the bridge piece 22 so that the bar 27 may have its outer edge swung to a plane beyond that in which the outer faces of the slats 24 extend.

Referring now more particularly to Figure 1 it will be seen that the frame has been associated with the carriage, and the whole has been tilted so that the lower end of the frame is substantially in line with the block 29, having an upper base inclined in a plane extending substantially at right angles to the face of the frame. An operator may now leave the parts in this position, and bricks 30 may be stacked, care being taken that the lowermost row of bricks extends below the upper edge of the flange 23. Upon a stack having been completed, the operator may grasp the handles 17 and 25, and tilt the carriage to the position indicated in Figure 2, which will result, as has also been indicated in this figure, in the stack of bricks remaining in the formation in which they have been disposed.

Obviously the foregoing operations will in no way injure the brick or other objects being handled, and now with a view of providing a method of disposing of the stack of bricks at any desired storage points, reference is had to Figures 3 and 4 in which it will be seen that the parts have been brought to the position shown in Figure 1, with the exception that in lieu of the block 29, a pallet is positioned upon the supporting surface, and with which the stack of bricks are adapted to be brought into alignment.

This pallet 31 preferably comprises a bar of a length equivalent to the breadth of the stack, but of a width shorter than the width thereof. Thus upon the parts being brought to the position indicated in Figure 3, the stacks of bricks 30 will be supported partially upon the pallet 31, the lower edge of the frame engaging the supporting surface. Upon the tilting operation being continued, the frame may be swung clear of the supporting carriage in the manner aforedescribed, and as has been indicated in Figure 4, the tilting of the stack 30 may be continued to a point at which the same is disposed in a vertical plane, the frame being capable of ready disengagement from the stack by virtue of the fact that the width of the pallet 31 is less than the width of the stack of bricks thus forming a movable space for the flange 23 to clear the lower edge of the same, whereby a removal of the frame is permitted.

Figure 6:
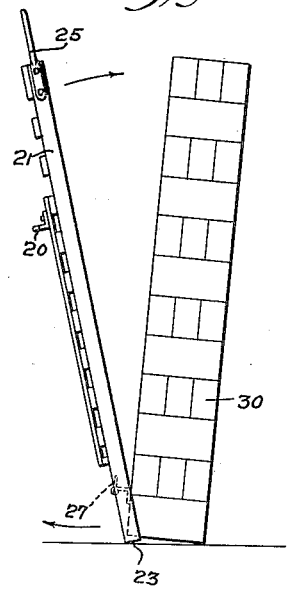
Figure 6 illustrates the arrangement of the apparatus and stack upon the latter being disposed upon a surface such as the floor of a freight car.
Figure 7:
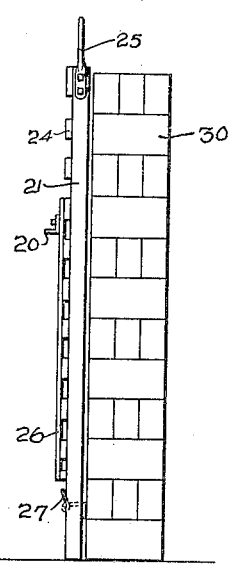
Figure 7 is a view similar to Figure 4 but showing the parts subsequent to the action illustrated in Figure 6.
Figure 8:
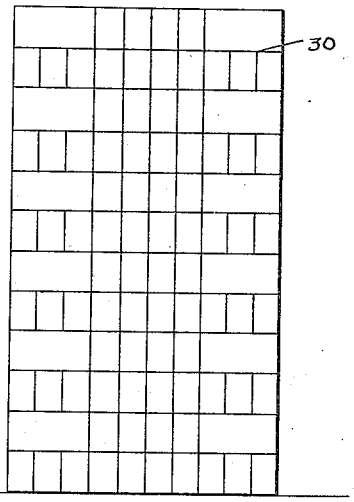
Figure 8 illustrates a stack which may be conveniently formed in accordance with my method.

It will be obvious that by a reversal of the operations named in the preceding paragraph the stack 30 may again be disposed upon the frame of the supporting carriage, and subsequently transported to any desired position and again be subjected to transportation any desired number of times. Further, if it is desired to place the stack 30 in its final position, or upon the floor of a freight car, it will be seen that it might be desirable to dispense with the pallet 31 as shown in Figures 6, 7 and 8.

In these figures the stack and the frame are tilted in their upright position until the base of the stack and the flange 23 rest on the floor; then the frame is slightly pulled away from the stack until the bar 27 can be swung so as to place its outer edge against the face of the stack, thereby forming a fulcrum between the frame and the stack. The frame is then again swung toward the stack, and in so doing it will be noted that by virtue of the fulcrum 27 the flange 23 withdraws from beneath the base of the stack.

Upon the frame being swung around the fulcrum thus provided, in the direction of the arrow in this figure, it will be seen that the lower end or flange portion of the frame below the fulcrum will be moved outwardly, as has been indicated by the arrow, thus permitting of the clearing of the stack 30 by the flange portion, the frame assuming the position indicated in Figure 7. Subsequent to this the frame is removed, and the stack 30 rests in the position desired, and without the provision of the pallet 31 interposed between the supporting surface and its lower face.

Thus I have conceived of and provided a method permitting of the handling of bricks in a most efficient manner by means of which a great number may be transported at one time by a relatively weak person, and without subjecting the bricks to the strains to which they are ordinarily exposed.

It will further be seen that although my invention is primarily intended for use in connection with bricks, as set forth in the preamble, the same will limit itself to use in connection with the handling of blocks, packages or any articles capable of being stacked.

Obviously numerous variations of the method, as well as structural variations of the apparatus may be resorted to without in the least departing from the spirit of my invention, which I claim as:

1. A herein described method, which consists in piling a stack of bricks on a carriage with the stack tilted at an angle to the vertical, placing said stack in a vertical position, rocking the stack in a direction which is opposite to the angle of inclination of the previous positions of the stack, and removing the carriage from the stack.

2. A transporting apparatus including a carriage, a frame removably mounted on the carriage adapted to support a stack of bricks, said frame adapted to be tilted vertically for depositing the stack in a vertical position, and a rockable means on the frame adapted to be moved into engagement with the stack of bricks and act as a fulcrum whereby when said frame is rocked the same will be released from the stack.

3. In a device of the class described, a frame adapted to support a stack of bricks in either a horizontal or vertical position, means on one end of the frame engaging the lowermost bricks on the stack for retaining the stack on the frame, and movable means on the frame engageable with the stack when said stack is in a vertical position, and forming a fulcrum for the frame whereby when the frame is rocked said frame will be released from the stack.

4. A transporting apparatus including a carriage, brackets secured to said carriage, a frame adapted to rest upon said brackets and support a stack of bricks in either a horizontal or vertical position, a projection secured to said frame and engageable with one of the brackets for retaining the frame on the carriage, and a rockable means on the frame and engageable with the stack when said stack and frame are placed in a vertical position to act as a fulcrum whereby when the frame is rocked the same will be disengaged from the stack.

5. A transporting apparatus, including a carriage, brackets secured to said carriage, a frame adapted to removably rest upon said brackets and support a stack of bricks in either a horizontal or vertical position, a projection on the frame and engageable with one of said brackets for maintaining the frame on the carriage when horizontally disposed while permitting release of the frame from the carriage when said frame and carriage are tilted to a predetermined position, and a rockable means on the frame adapted to engage the stack of bricks when vertically positioned for causing the frame to become disengaged from the stack when said frame is rocked, the rockable means acting as a fulcrum for the frame.

6. A brick transporting apparatus including a carriage, a frame removably mounted on said carriage and adapted to support a stack of bricks in either a horizontal or vertical position, and means on the frame providing a fulcrum for rocking the frame relative to the bricks when said fulcrum is engaged with the bricks for disengaging the frame from the stack when said frame is in a vertical position.

7. A transporting apparatus including a carriage, a frame removably mounted on said carriage and adapted to support a stack of bricks, a bar rockably mounted adjacent one end of said frame and engageable with the stack of bricks when the frame and bricks are located in a vertical position, said rockable bar providing a fulcrum for the frame engageable with the stack whereby the frame is forced from its engagement with the stack when the said frame is rocked on the bar as a fulcrum.

8. The combination with a carriage, a frame removably mounted on said carriage adapted to be tilted between a horizontal and vertical position, of a block having a face inclined at an angle to the horizontal and adapted to be positioned adjacent the lower end of the frame when said frame is inclined at an angle to the vertical, said block cooperating with the frame in a manner to permit a stack of bricks to be formed on the frame and inclined at an angle to the vertical, means on the lower end of the frame adjacent the block and cooperating with the block for supporting the stack of bricks in its inclined position, said frame and means on the end of the frame adapted to support the bricks when moved to a horizontal position.

WILLIAM HENRY FRANCIS.